July 7, 1970  E. J. ARDOLINO ET AL  3,519,510
FORMATION OF STRUCTURAL HONEYCOMB
Filed May 26, 1967  2 Sheets-Sheet 2
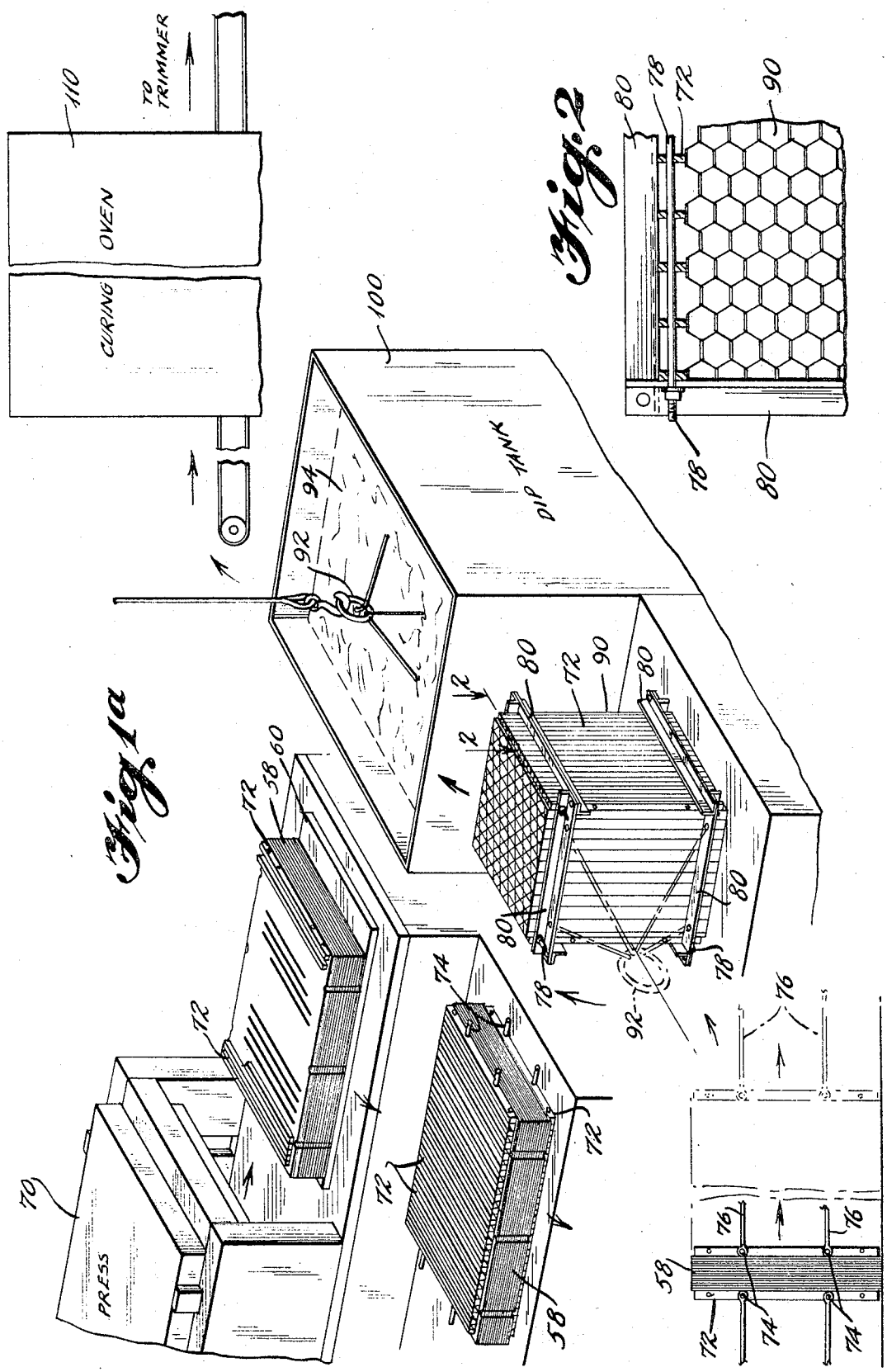

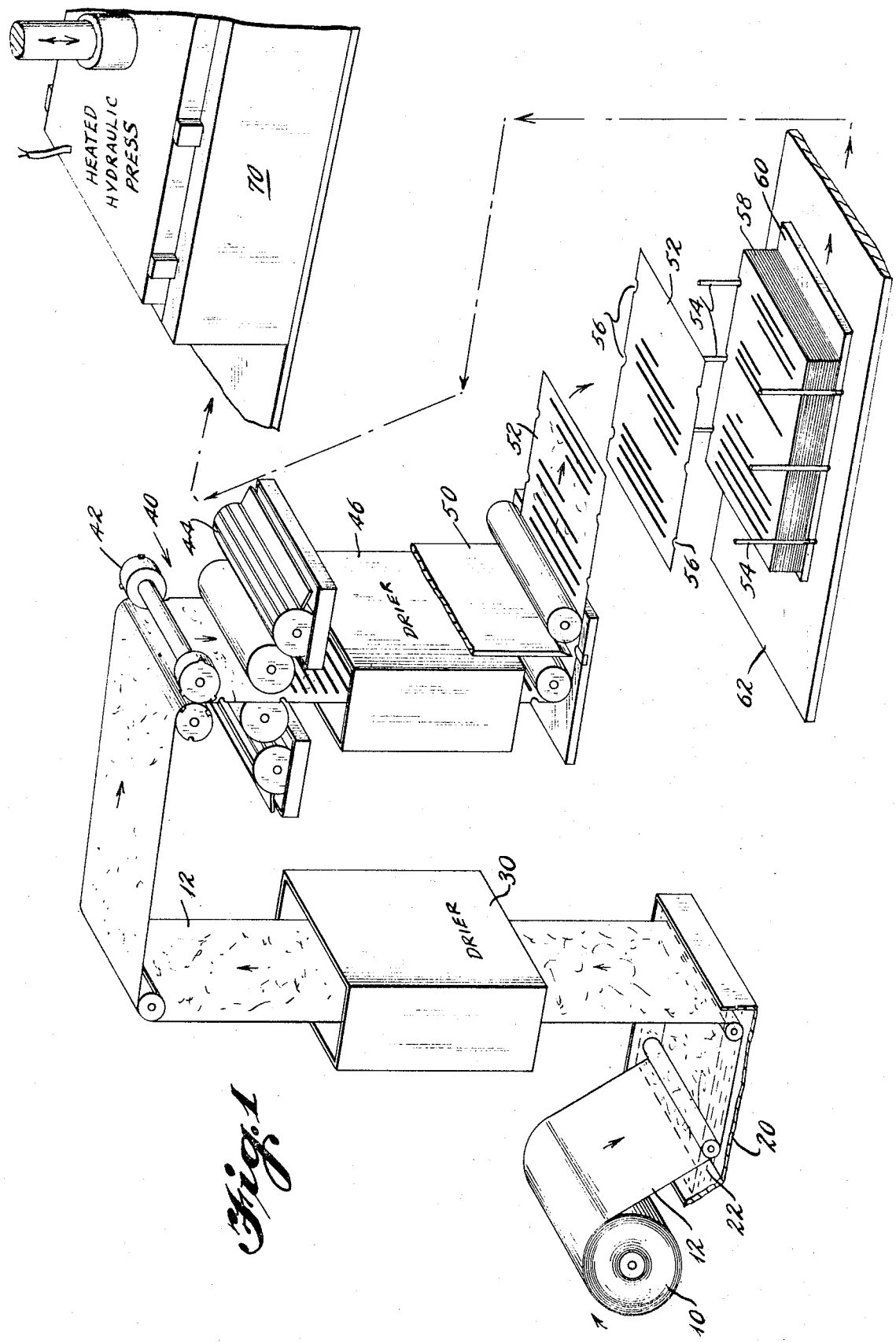

United States Patent Office 3,519,510
Patented July 7, 1970

3,519,510
FORMATION OF STRUCTURAL HONEYCOMB
Edward J. Ardolino, Box 169A, Robin Hood Road, Havre de Grace, Md. 21078; Joseph D. Bova, 2104 Harford Road, Fallston, Md. 21047; and Donald P. Hoover, R.D. 3, Barkess Court, Aberdeen, Md. 21001
Filed May 26, 1967, Ser. No. 641,634
Int. Cl. B31d 3/02
U.S. Cl. 156—197    6 Claims

ABSTRACT OF THE DISCLOSURE

The present invention is directed to a method of forming a structural honeycomb from a fibrous web. The procedure involves pre-impregnating the fibrous web with a non-blocking thermoplastic film forming resin, then printing glue lines with a heat settable adhesive. The web is then converted into structural honeycomb. A preferred polyimide pre-impregnant is the condensation product of 3,4-dicarboxy-1,2,3,4-tetrahydro-1-naphthalenesuccinic dianhydride and p,p'-diaminodiphenylmethane.

---

This invention relates to a procedure for preparing an improved fiberglass structural honeycomb.

Honeycomb is commonly formed from a web of sheet material by imprinting thereon parallel, equally spaced apart glue or adhesive lines, usually on both faces thereof, the glue lines on opposite faces being staggered relative to each other, then cutting equal sheet sections from the web and stacking the sections in face-to-face contact, with every other sheet section being alternated so as to provide a glue line-to-glue line contact. Thereafter, the glue is cured to laminate the stack, after which the laminated stack is expanded, the laminated sheet stack deforming into a hexagonally shaped honeycomb structure.

Among the diverse numerous materials suggested for honeycomb formation are metal, e.g. aluminum, glass fabric, paper, rubber; the properties of the original web material determine, to a large extent, the nature of the final honeycomb product. Thus, when the honeycomb is formed from aluminum foil, the expansion step permanently deforms this metal and a stable structural honeycomb product directly results. On the other hand, if rubber sheeting were transformed into honeycomb, expansion does not permanently deform the rubber due to its elasticity, and the honeycomb would collapse back into the unexpanded state. Honeycomb based on fibrous webs including paper and fabrics, e.g. fiber glass fabrics, also exhibits a tendency to collapse back into the unexpanded form. For structural honeycomb, this tendency to collapse and the poor compression strength of fibrous webs are not desirable properties. Within the context of this invention, the term structural honeycomb may be taken as meaning a stable, expanded honeycomb capable of bearing some load in compression. Therefore, in the formation of structural honeycomb from fibrous webs, the web is impregnated with a thermosetting resin at some point during the procedure, and subsequent to the expansion step the resin is cured to lock the honeycomb in its expanded position.

The present invention relates to an improved procedure for forming structural honeycomb from a fibrous web, preferably using a fine weave fiber glass fabric.

The object of the present invention, then, is to provide an advantageous technique for making a light weight structural honeycomb from a fibrous web.

Honeycomb formation from fibrous webs requires careful interrelation of the several steps and of the several materials employed. Thus, for example, some impregnation of the fibrous web prior to printing the glue line is desirable. Otherwise, much or even all of the glue becomes absorbed inside the fibrous web, leaving on the web surface insufficient glue for bonding the successive sheets together into a stack. If a thermosetting resin is employed for this pre-impregnation, as it may be called, all subsequent steps must be effected at temperature levels below the curing temperature of the thermosetting resin, dictating use later of a glue which cures near room temperatures.

The present procedure employs a different integration of materials and procedure. Specifically, the fibrous web is preimpregnated with just enough resin pick-up to close off interstices between the fibers, using for this purpose non-blocking thermoplastic resin stable at elevated temperatures. The resin pick-up (dry basis) should be from about 2–10% by weight, based upon the weight of the dry fabric, preferably 5–7% by weight. Then the glue line is printed onto the fibrous web (employing suitably the notching and offset technique disclosed by Pat. 3,242,024) using a heat-set adhesive. Heat-set adhesives as a general class of materials are commonly believed to be superior to room temperature adhesives in bond strength. They are also much easier to handle. Thereafter, the web is cut and stacked (which may be done as described in the Bova Pat. 3,242,024) into the honeycomb core.

Use of a thermally stable non-setting and non-blocking film forming pre-impregnant permits heat activating the glue line adhesive at elevated temperatures in order to obtain the desired laminated (unexpanded) stack. The next step is expansion of the stack to form a honeycomb core, a step which may be done by conventional loop technique or by other techniques. However, since the fibrous web honeycomb retains an elastic tendency to collapse and has poor strength in compression (relative to its strength under tension) it becomes necessary to retain the honeycomb in its expanded position. This may be done by providing a suitable frame for holding the expanded honeycomb.

The framed honeycomb is then dipped into an impregnating bath containing a suitable thermosetting resin (heat settable) solution, and thereafter the impregnated honeycomb is cured to set the impregnated resin, thereby locking the honeycomb structure into its final rigid structural honeycomb form. After waste is trimmed away, usually from all six sides, the honeycomb is now ready for shipping or fabrication into ultimate products.

For further understanding of the present invention, reference is now made to the attached drawing in which:

FIGS. 1 and 1a diagrammatically illustrate the process as a whole in terms of a preferred embodiment thereof; and FIG. 2 is a partial section taken along line 2—2 on FIG. 1a.

The starting point for the present procedure is a roll 10 of a fibrous web 12. Suitably, web 12 is a relatively fine weave fiber glass fabric which, for example, may be Hess, Goldsmith & Co. style 108 with a 112 finish. Other equally suitable styles are their 112, 116, 412. The web passes through impregnating bath 20 and there picks up 6% of a thermoplastic resin from the solvent solution 22. The solvent is removed by passage of web 12 through drier 30.

A preferred class of non-blocking impregnants of high thermal stability are the thermoplastic polyimide resins prepared by reacting a 3,4-dicarboxy-1,2,3,4-tetrahydro-1-naphthalenesuccinic dianhydride with a diamine. These polyimide resins may be represented by the following formula:

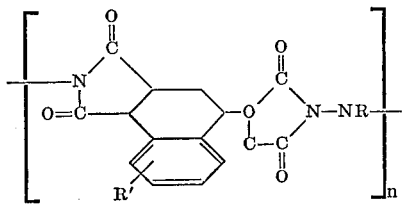

wherein R is a divalent organic radical; wherein R' is selected from the group consisting of hydrogen and an alkyl group containing from 1 to 7 carbon atoms, wherein $n$ is a whole positive integer between 10 and 400, inclusive and the terminal groups are the residue of the dianhydride.

As a particularly desirable member of this series of resinous materials, one may note the reaction product of equimolar quantities of 3,4-dicarboxy-1,2,3,4-tetrahydro-1-naphthalenesuccinic dianhydride and p,p'-diaminodiphenyl methane to form a tough, hard thermoplastic having the structure:

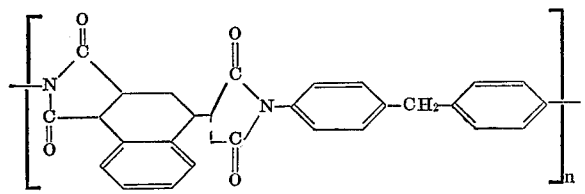

wherein $n$ is as defined above. This particular material has excellent handling properties in addition to its other physical properties and quite unexpectedly is relatively transparent.

This polyimide preparation may be illustrated by the following reaction scheme:

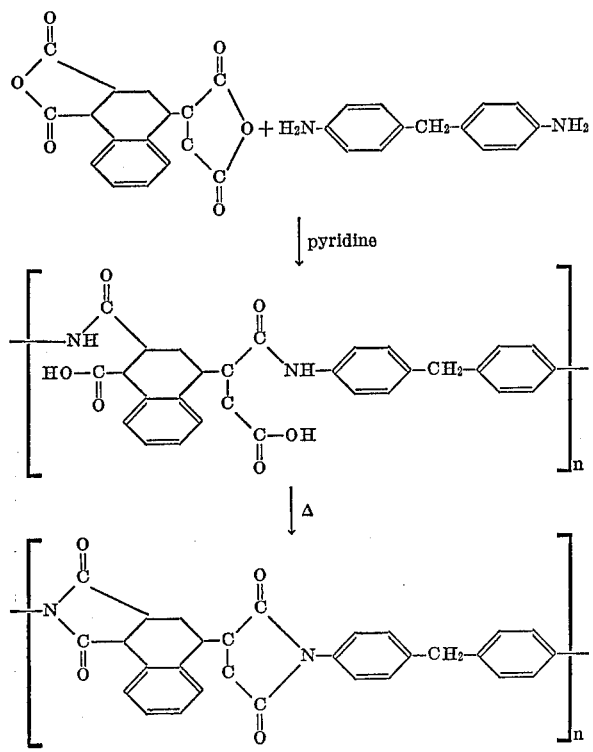

In the above reaction, the 3,4-dicarboxy-1,2,3,4-tetrahydro-1-naphthalenesuccinic dianhydride is reacted with a suitable diamine (in this case diaminodiphenylmethane) dissolved in a solvent, such as pyridine, for about four hours at room temperature to form a polyamide. This intermediate polyamide, after being precipitated in ethyl acetate, for example, is then converted to the corresponding polyimide by heating at an elevated temperature (around 200° C.) for about 3 to 6 hours under vacuum. The polyimide polymer resulting has been analyzed and found to conform to the general structure indicated above.

The polyimide materials thus produced in the manner depicted have been found to be tough, hard, fusible materials with outstanding thermal and oxidative stability. They are, of course, suitable for impregnation into various materials such as glass fibers, wood pulp, papers, textile fabrics, and the like.

As has already been indicated, pre-impregnation of the fibrous web involves a relatively small pick-up, i.e. 2–10% by dry weight of a fiber glass fabric and preferably 5–7% by weight. Advantageously, the pre-impregnation serves to seal off the fabric pores and, depending, of course, on the fiber base. The surface of the fibers themselves are sealed so that when later the web is imprinted with glue lines, the adhesive solution thereof is not lost by absorption into the fiber or penetration into the interstices of the fabric (e.g. by striking or bleeding through). The adhesive then remains largely on the surface.

Although shown in the drawing as an integral step in a flow sheet procedure, pre-impregnation in bath 20 and subsequent drying in drier 30 may be carried out as a separate and distinct preliminary step otherwise unconnected with the process as a whole. Conceivably, a suitably pre-impregnated fibrous web may be purchased for use to make the structural honeycomb. In any event, dry to the touch, pre-impregnated fibrous web 12 passes into a glue line printing system 40, which in a preferred embodiment is constructed according to the principles disclosed in Bova et al. Pat. 3,242,024 to transversely print glue lines and to aperture the fabric in a fixed spacing relation of apertures to glue lines. A notching and offset printing mechanism generally as described in that patent are diagrammatically illustrated by members 42 and 44 respectively. Transverse printing of glue lines is advantageous in offering a virtually infinite ribbon direction length and therefore an ultimate structural honeycomb of infinite "1" dimension. However, longitudinal printing of the glue lines, e.g. by the conventional washer technique, is also contemplated for practice of this invention. In passing, it may be noted also that, while the aforementioned Bova patent contemplates transverse printing on both sides of the web, then alternating every other sheet, it is, of course, possible to achieve the honeycomb formation by printing in effect a double height glue line only on one side of the web. So long as every other sheet in the stack is offset lengthwise the distance of half a glue line spacing, the same hexagonal honeycomb will be obtained. The actual printing and stacking equipment does not, per se, form a part of the present procedure, except, of course, insofar as use of satisfactory glue line printing equipment forms a necessary part of the present procedure.

To repeat, the drawing illustrates a preferred arrangement of equipment, namely that shown and disclosed in the aforementioned Pat. 3,242,024, wherein the web 12 passes through notching unit 42, then is transversely printed with parallel, spaced apart glue lines by a gravure-offset unit 44, dried in drier 46, and thereafter cut by guillotine 50 and stacked in proper glue line alignment by stacking successive sheet sections 52 with pins 54 set in apertures 56. Pins 54 are part of stacking table 62 on which sits transfer rack 60. The transfer plate or rack 60 on which the sheet sections 52 are stacked may be moved as a unit to heated curing press 70.

Allusion has already been made to the desirability of employing a heat-setting adhesive for glue line printing. For providing a high quality, high strength bond, heat-setting adhesive resin systems are preferred, because generally they offer higher bond strengths than low (e.g. room) temperature adhesives, particularly when the laminate must be subjected later to elevated temperatures. Generally speaking, the adhesive, per se, forms no part of the present invention other than by exhibiting a heat curing characteristic (for which, in part, the adhesive has been selected) and its adhesive characteristic i.e. its ability to bond to the pre-impregnated fibrous web. Actual adhesive systems contemplated as preferred for the glue lines in the present procedure are the epoxy resin based adhesive systems. These materials are well known to the art (reference, for example, being made to the text "Epoxy Resins" by Lee and Neville, McGraw-Hill Book Company, Inc., N.Y., 1957, particularly chapters 9 and 10). The polyamide-epoxy resin mixtures described in that text have proven satisfactory for the glue lines. In practice, the resins are dissolved in solvents suitably mixtures of methanol and ethylene dichloride, thickened with silica gel and catalyzed by dicyandiamide. Presence of a dye is desirable for the printing operation (for quality control inspection purposes). The solvents are removed in drier 46 at temperatures below the activation temperature for the adhesive just prior to severing the web into sheet sections.

Once the fibrous web 12 has been severed into sheet sections 52 and the sheet sections stacked in proper alternation on transfer plate 60, the unexpanded stack 58 may be suitably clamped to place the sheets under pressure, then heated under pressure at about 150° C. for one hour in heated press 70 to activate the adhesive of the glue lines and bond the stack 58 into a unitary, unexpanded honeycomb core. Advantageously, the high thermal stability of the pre-impregnant (preferably the polyimide, which is stable to above the curing temperature level of the adhesive and of the later impregnant resin) is what permits use of a heat-set adhesive. In terms of the process as a whole, pre-impregnation of the fibrous web with a heat-stable thermoplastic resin and printing with a heat settable adhesive permits facile glue line printing with an adhesive system which is easily handled, being solvent dispersible (for cleaning the equipment) and stable (which permits storage overnight). The pre-impregnation and the glue line printing operations may be conveniently scheduled, as for example to terminate a run when web roll 10 is ended, rather than when stack 58 is completed. The half-finished stack may be left overnight, since the dried adhesive is not activated except by heat treatment in press 70.

The stack leaving the adhesive press 70 must now be expanded. At this point, the structural characteristics of the basic fibrous web become quite important to processing conditions, because once expanded, the honeycomb must be maintained in expanded condition by some form of restraining means, else the honeycomb will collapse. Conventional loop expansion techniques may be employed, but are considered less satisfactory than the cleat system of expansion illustrated in the drawing, because the cleat system has been found to minimize wastage, i.e. less honeycomb material must be trimmed from the final cured product. The cleat system involves edge gluing thin wooden slats 72 (which may be conventional ¼" by 2" firring strips) to the face of stack 58 parallel to the glue lines, top and bottom, a cleat at about every other glue line. The cleats each have four spaced apart holes drilled therein. Steel rods 74 placed in two of the holes and tension cables 76 attached to the two rods apply a uniform tensile stress to each cleat, causing honeycomb stack 58 to expand, extending smoothly to its fully expanded hexagonal shape. Thereafter, and while enough tension is applied to prevent collapse, another set of rods 78 are introduced into the other two holes of cleats 72, and angle irons 80 are positioned at the four sides of the now expanded honeycomb stack (as is generally illustrated in the drawing) and locked to rods 78 and to each other. This transfers the tension stress to the angle irons 80, providing between rods 78, cleats 72 and irons 80 a box frame which maintains the honeycomb in its expanded state.

The expanded frame support stack 90 may be lifted by a sling structure 92, then dipped into liquid bath 94 in dip tank 100. Bath 94 may be a conventional laminating and impregnating thermosetting resin (e.g. phenol formaldehyde heat resistant type resin) commonly employed in the formation of fibrous web laminates. Since a single dip impregnation does not usually provide sufficient resin pick-up, preferred practice is to impregnate, then air dry then cure, impregnate again, then air dry, etc., until sufficient resin pick-up has been attained. Desirably, the curing step, effected in curing oven 110, is effected at ever increasing temperatures, final curing temperatures being reached in oven 110 only after the last impregnation. Desirably, the attitude of the honeycomb is changed during each dip to pick up resin uniformly throughout the honeycomb. Thus, the honeycomb bottom, so to speak, at one dip will become the top at another dip. When framed honeycomb expanded stack 90 is raised and the excess resin pours from the expanded stack; the floor over which the excess resin flows changes with each dip so that at least once during successive dips each internal cell surface has been coated top to bottom. In any event, the impregnated, expanded honeycomb core, now cured in oven 110, to set the impregnating resin constitutes the ultimate honeycomb. It is trimmed (by sawing) to remove some edge layers, i.e. those containing cleats 72, a little material on the sides and top and bottom, so that there results finally a uniform block of structural honeycomb of resin reinforced fibrous material. It is a high strength, low weight material, e.g. $3\#/ft.^3$. The structural honeycomb may be shipped to fabricators for conversion into ultimate products.

In order that the concepts of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

EXAMPLE I

To a suitable reaction vessel equipped with stirrer and thermometer there is introduced 79.2 parts (0.4 moles) of p,p'-diamino-diphenylmethane dissolved in 470 parts of pyridine. To the above agitated solution is added slowly 120 parts (0.4 moles) of 3,4-dicarboxy-1,2,3,4-tetrahydro-1-naphthalenesuccinic dianhydride over a four hour period. The temperature is kept below 35° C. during the course of the reaction. A viscous solution results which is diluted with 189 parts of pyridine. The resulting polyamide is precipitated in ethyl acetate and converted to the polyimide by heating at 200° C. for three hours under vacuum. The resulting polyimide is soluble in a number of common solvents.

EXAMPLE II

Example I was repeated in substantially all details, except that in the place of p,p'-diamino-diphenylmethane there was used an equivalent amount of p,p'-diamino-diphenylether. The resultant polyimide are soluble.

EXAMPLES III–VIII

Example II was repeated in substantially all details, except that in the place of p,p'-diamino-diphenylmethane there was used a stoichiometrically equivalent quantity of the following amine reactants:

| Example: | Diamine reactant |
|---|---|
| 3 | p-phenylene-diamine. |
| 4 | 4,4'-diamino-diphenylsulfone. |
| 5 | 3,3'-diamino-diphenylsulfone. |
| 6 | 1,6-hexamethylene-diamine. |
| 7 | 1,4-cyclohexane-bis(methylamine). |
| 8 | m-phenylene diamine. |

The polyimides have overcome the poor solubility characteristics of known polyimides. In the instant case, the polyimides described are soluble in a number of common solvents such as dimethyl-formamide, dimethyl-acetamide, dimethylsulfoxide pyridine, methyl pyrolidone and the like. Because of this fact, these polyimides can be impregnated into glass fabrics or other fibrous substrates like paper or fabrics, e.g. cotton, asbestos, nylon.

EXAMPLE IX

Procedure for preparation of "PREPREG"

Tetralin dianhydride-methylene dianiline polyimide is dissolved to a 10% solids solution in dimethylformamide. This solution is used as impregnating bath 22 to impregnate and form a film on Hess Goldsmith fiber glass cloth style 116 (with heat clean finish) at 80° F. The dry resin content of the cloth was 6%.

Substituting for the above polyimide, the same amount of Pyre-M-L-5057 (Dupont) produced a satisfactory impregnation of the fiber glass cloth.

EXAMPLE X

A suitable formulation composition for printing the glue lines is:

|  | Grams |
|---|---|
| Nylon-(soluble terpolymer Dupont-Elvamid 8061) | 75 |
| Epoxy resin (epoxidized amino phenol-epoxy equivalent 200) | 25 |
| Dicyandiamide | 2.5 |
| Dye (red) | 0.2 |
| Methanol | 200 |
| Ethylenedichloride | 100 |

The epoxy resin is dissolved in the solvents (at about 50° C.); thereafter the polyamide is dissolved; then after letting the mixture cool to room temperature, the dicyandiamide is added. The mixture may be stored in freezer if not used within about 24 hours. The soluble products made according to the examples in Pat. 2,285,009 may be employed as the nylon in place of the Elvamid 8061.

The solution as above described may be imprinted transversely as the glue line, which, for example, is 0.085" wide on a 4 per inch basis and stands 0.007" high on the fiber glass pre-preg. The fiber glass pre-impregnated fabric 12 is dried at 60° C. without activating the adhesive. The fabric is cut into sheet sections and the sheet sections stacked in face to face glue line contact, 1200 sheets to the stack. The stack is placed in a steam heated press. The adhesive is cured for one hour at 150° C., the press 70 applying a pressure of about 300 p.s.i.

EXAMPLE XI

The following room temperature adhesive formulation was employed to secure wooden cleats (firring strips ¼" x 2") edge glued to the pre-impregnated fiber glass fabric stack 58.

100 grams of epoxy resin (condensate of bis-phenol A and epichlorohydrin, epoxy equivalent about 200) and 20 grams of diethylenetriamine were mixed, then 2 grams of silica gel (thickener) added and the mixture applied to the wooden cleats (standard 2" x ¼" firring strips). The cleats were edge glued to the unexpanded stack 58 and the whole cured at about 60° C. for 1 hour.

Commercially available equivalent formulation materials are: Dow 2633.17 (epoxy resin) 100 grams, Genamid 2000 (General Mills) 35 grams and 2 grams of silica-gel (Cab-O-Sil M-5—Cabot).

Since these room temperature type adhesives have a high strength at ambient temperatures but lose considerable strength after exposure to elevated temperatures, e.g. curing temperature levels in oven 110, recovery and repeated use of the wooden cleats 72 from the trimmed waste is facilitated by use of such room temperature adhesives.

EXAMPLE XII

A solution of a typical heat resistant phenol formaldehyde impregnating resin (86% in ethanol, or in isopropanol-water) diluted to 35% with isopropyl alcohol is employed for impregnating the expanded stack to about a 125% resin pick-up (based on fiber glass weight) using 4 dips. The fiber glass honeycomb product weighed about 3.3#/ft.³.

A commercially available equivalent material is Allied Chemical Co. Plaskon-204 diluted with isopropyl alcohol to a 35% solids content and employed for impregnation as above.

What is claimed is:
1. A process for making structural honeycomb which comprises the successive steps of:
pre-impregnating a fibrous web with a non-blocking thermoplastic film forming resin stable at elevated temperatures;
printing spaced apart glue lines on at least one face of said fibrous web, the adhesive in said glue lines being a heat curing type;
cutting the impregnated glue line printed fibrous web into successive sheet sections, stacking the sheet sections face to face with the parallel glue lines of adjacent sheets staggered relative to one another;
heat curing the adhesive in the glue lines, whereby the stacked face to face sheets become joined through the glue lines into an unexpanded honeycomb stack;
expanding the stack into honeycomb shape, then adding frame members to prevent collapse of said honeycomb shape;
impregnating the framed honeycomb with a heat settable thermosetting reinforcing resin, and heat curing to form structural honeycomb, the framing members being removed.

2. A process as in claim 1 wherein the impregnant is a polyimide resin having recurring units of:

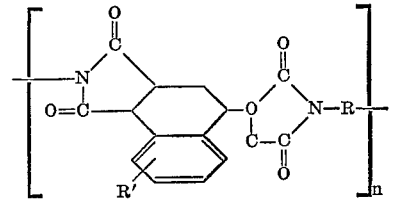

wherein R is a divalent organic radical; wherein R' is selected from the group consisting of hydrogen and an alkyl group containing from 1 to 7 carbon atoms; wherein $n$ is a whole positive integer between 10 and 400, inclusive.

3. A process as in claim 1 wherein the fibrous web is a fiber glass fabric.

4. A process as in claim 1 wherein the adhesive in the glue lines is a polyamide-epoxy resin heat setting adhesive.

5. A process as in claim 1 wherein the glue lines are printed transverse of the web.

6. The process of claim 1 wherein the polyimide is the resinous condensation product of 3,4-dicarboxy- 1,2,3,4-tetrahydro-1-naphthalenesuccinic dianhydride and p,p'-diaminodiphenyl methane.

References Cited

UNITED STATES PATENTS

| | | | |
|---|---|---|---|
| 2,282,421 | 5/1942 | Luby | 161—68 |
| 2,581,421 | 1/1952 | Lombard et al. | 161—68 X |
| 2,608,502 | 8/1952 | Merriman | 156—197 |
| 2,674,295 | 4/1954 | Steele et al. | 156—197 |
| 2,983,640 | 5/1961 | Knoll et al. | 156—197 |
| 3,179,634 | 4/1965 | Edwards | 117—126 |

SAMUEL W. ENGLE, Primary Examiner

U.S. Cl. X.R.

156—229, 494; 161—68

PO-1050
(5/69)

UNITED STATES PATENT OFFICE
CERTIFICATE OF CORRECTION

Patent No. 3,519,510　　　　　Dated July 27, 1970

Inventor(s) Edward J. Ardolino et al.

It is certified that error appears in the above-identified patent and that said Letters Patent are hereby corrected as shown below:

In the designation of Ownership of the patent, please identify American Cyanamid Company as the Assignee.

Column 3, in the first designated formula, that portion of the formula reading

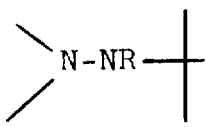　　should read　　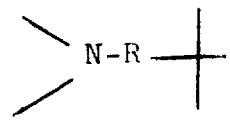

SIGNED AND
SEALED
NOV 24 1970

(SEAL)
Attest:

Edward M. Fletcher, Jr.
Attesting Officer

WILLIAM E. SCHUYLER, JR.
Commissioner of Patents